May 7, 1968  C. L. ADAMS ET AL  3,381,528

APPARATUS FOR DETERMINING DRAPE OF FLEXIBLE MATERIALS

Filed Oct. 21, 1964  2 Sheets-Sheet 1

INVENTORS
CHARLES L. ADAMS
BY RICHARD J. MC FALLS

May 7, 1968  C. L. ADAMS ET AL  3,381,528
APPARATUS FOR DETERMINING DRAPE OF FLEXIBLE MATERIALS
Filed Oct. 21, 1964  2 Sheets-Sheet 2

INVENTORS
CHARLES L. ADAMS
RICHARD J. MC FALLS
BY *Leo Joyner*
*Attorney*

United States Patent Office 3,381,528
Patented May 7, 1968

3,381,528
APPARATUS FOR DETERMINING DRAPE OF FLEXIBLE MATERIALS
Charles L. Adams, Waterford, and Richard J. McFalls, Troy, N.Y., assignors, by mesne assignments, to Clupak, Inc., New York, N.Y., a corporation of Delaware
Filed Oct. 21, 1964, Ser. No. 405,398
2 Claims. (Cl. 73—159)

The present invention relates generally to the testing of flexible materials and more particularly to an apparatus and method for determining static and dynamic characteristics of flexible material which are an indication of the drape of such material, especially such materials as are associated with the garment, textile, paper and coverings industries. Those persons who work with flexible materials are constantly seeking improved means for measuring the properties of such materials. Such things as tear strength and resistance to the elements can be readily determined. Unfortunately, such is not true of one of the most important properties of flexible materials which is still the subject of imperfect and often haphazard testing. This most important property is drape. Drape has generally been considered a static property of flexible materials being the manner in which a fabric falls or hangs in folds when hung or placed on a form. The present inventors performed many tests on samples of flexible materials and as a result of these tests, the present inventors arrived at a determination that drape, in order to be mechanically measured, must be considered a complex property composed of both static and dynamic elements.

The non-mechanical method used to evaluate the drape of a material is to visually view a particular sample as it hangs freely from some sort of support, and to judge its appearance in terms of a spectrum of the various other materials; one aspect of appearance being the nature and number of folds or cusps visible. Such a categorization is purely based on individual personal judgment and so is open to wide variations from individual expert to individual expert.

Various mechanical methods of measuring certain properties of flexible materials have been developed by the art and many appear in prior art patents. These devices, although generally performing satisfactorily a particular function, do not possess the utility and wide applicability of the present invention. In one apparatus, a force is applied until the specimen sample bursts in diaphragm strain. In another, discrete weight increments are applied until a particular condition is believed by the observer to exist. In one, the test sample is artifically restrained while a force is made to act upon the sample. Such restraint inhibits the natural behavior of the sample in some indeterminable fashion. For a true determination of drape, the sample must be allowed to freely array itself in multiplanar deformation.

The present invention is adapted to measurement of drape while the subject material is in its most natural mode. Both static and dynamic characteristics are measured mechanically so that the present invention is well adapted to the testing of drape characteristics of webs, sheets, films and any of the broad range of flexible materials. Furthermore, by reason of the purely physical nature of the measurements taken, the present invention is valuable as a standard for quality control.

The present inventors have termed their apparatus a kinesimeter in order to point out more specifically the function of their invention. They wish to indicate that the measurement being taken is an indication of all forces involved with that quality or property of flexible materials termed drape. A finite force reading is assigned the material tested. This force is an indication of the drape of the material. This force is a result of many separate force components, the nature of which depends on the particular direction in which stress is set up in the subject material during a test. Different materials behave in different manners in this regard.

The present inventors have found that an improved measurement of drape is a significant contribution to the art.

Therefore, it is an object of the present invention to provide an apparatus adapted to measuring and recording a series of finite forces which combine to give an indication of the drape of a flexible material.

A further object is to provide a device for determining a finite value for drape of a flexible material in terms of force.

Another object is to provide a standard method for mechanically determining drape.

Another object is to provide an improved method of establishing the drape of flexible materials.

Another object is to provide a device which measures the true drape of a material without imposing restraints thereon.

A still further object is to provide a device to integrate instantaneous forces exerted on a flexible material as it is drawn through a restriction to provide a mechanical equivalent of work.

In accordance with one aspect of the present invention, the foregoing and other objects of the present invention are accomplished by mounting a sample to be tested in an unrestrained fashion; drawing the sample through an aperture or orifice, the sample being larger than the aperture or orifice; and measuring a series of instantaneous forces opposing movement of the sample through the aperture or orifice as the sample engages with the periphery theerof. For a more complete understanding of the present invention, reference should be made to the drawings wherein.

The drawings are to be understood to be more or less of a diagrammatic character for the purpose of illustration. Like characters identify the same elements in the several views.

Figure 1:
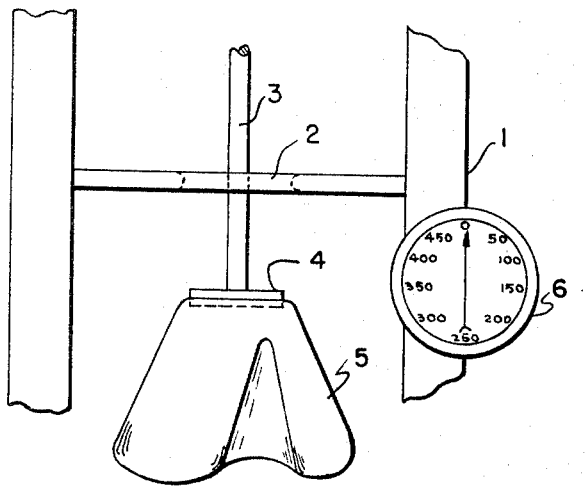
FIGURE 1 is a partial frontal elevation of a kinesimeter constructed in accordance with the present invention.

FIGURE 1 shows a kinesimeter comprising: a frame 1, a portion of which describes an opening 2 and a rod 3 movable within the opening. The rod 3 carries a mount 4 on which a flexible sample 5 is held. The rod is reciprocated by means of any suitable device. A force transducer 6 is attached to the apparatus. The transducer measures the forces opposing movement of the rod 3 due to engagement of the sample 5 with the periphery of the opening 2.

Figure 2:
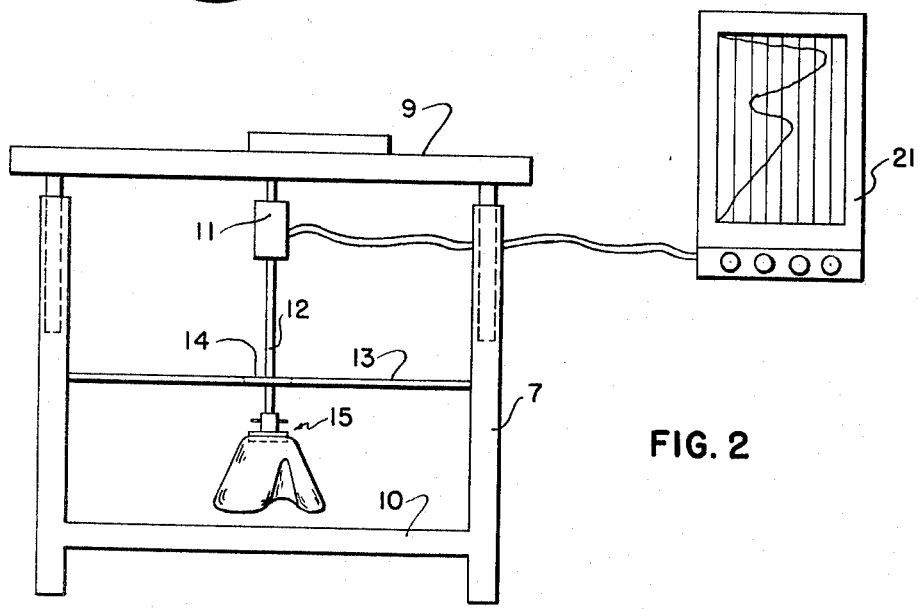
FIGURE 2 is a frontal elevation of a kinesimeter constructed in accordance with the present invention.

FIGURE 2 shows an embodiment of the present invention which includes a frame 7 comprising a relatively horizontal movable head 9 and a platform 10 located beneath the head. A force transducer 11 serves to connect a rigid rod 12 to the movable head so that the rod moves with the head as the head is motivated up and down; and any force opposing motion of the rod to correspond to motion of the head is sensed by the force transducer. The connection of the transducer to the head can be either rigid or pivotal.

A ring 13 having an aperture 14 therein is rigidly attached to the frame 7, at a convenient point above the platform 10. The exact location of this ring is not important to operation of the apparatus. However, for uniformity of test results, the plane of the aperture 14 in the ring 13 is maintained perpendicular to the plane of movement of the horizontal head 9. A pedestal or mount 15 is carried by the rod 12 at the free end of the rod.

Figure 3:
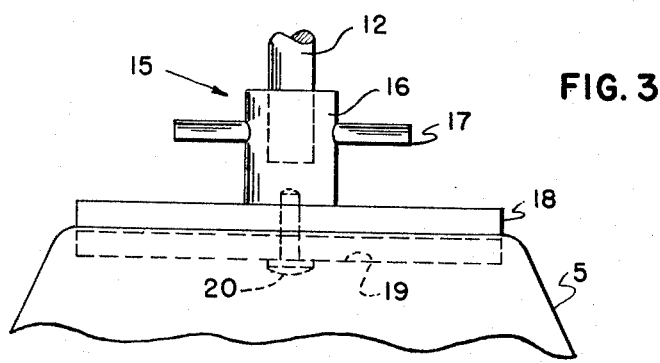
FIGURE 3 is a schematic detail of sample mounting means.

Referring now to FIGURE 3, the mount is affixed to the rod 12 and its center by means of a sleeve 16. For ease of connection, a pin 17 is used to support the sleeve on the rod. The pin is introduced through mating holes in the rod and in the sleeve. The mount 15 is composed of an upper disc or plate 18 and a lower disc or plate 19. A flexible sample 5 is placed between these discs approximately at its center. The discs are then clamped together by means of a bolt 20 which passes through holes in the center of the discs and engages the sleeve. This mode of support allows the sample to drape freely about the lower mounting disc. In this fashion, peripheral restraint of any sort applied by the amount is avoided. The discs 18 and 19 are circular and slightly smaller in diameter than the aperture 14 so that there is a small clearance between the discs and the aperture sides as the discs are passed through the aperture. The lower disc may be replaced by an inverted cone which would be attached similarly to the disc and would carry the sample in a similar fashion.

For a complete test, the ring 13 must be so situated in relation to the rod 12, that the rod can move within the aperture at least the length of the flexible sample 5 when the mounted sample is drawn through the aperture 14. This aspect will be more clearly seen from the portion of the description which follows.

Referring again to FIGURE 2, the force transducer 11 is connected in some suitable fashion to an indicating device 21. The indicating device shows the forces opposing the movement of the mounted sample through the aperture due to the filling of the clearance space between the periphery of the aperture and the sides of the mount by the material subject to test.

Any suitable means for moving the rod 12 is anticipated by the present inventors. The means used should have a capability of providing a continuous and equal rate of speed throughout all steps of a test as a sample is drawn through the aperture. The motivating means should be capable of a variety of speeds in order to be adaptable to the simulation of slow or rapid conditions of movement of the subject material in actual use. A typical speed of motion of the sample through the aperture is 12 in. per minute. This speed was utilized in many of the tests. However, other speeds have been used and have given satisfactory results.

The makeup of the ring 13 can be of any substantially rigid material. This is also true of the mount discs 18 and 19. Plastics have been used satisfactorily as well as hard steel. Due to the different coefficient of friction of various materials, each material chosen will have a somewhat different effect on the test results. The ring thickness has not as yet been subjected to extensive test; but the present inventors anticipate some optimum thickness although any thickness used would produce an operative apparatus.

An aperture diameter of 2-inches utilized in combination with nominal 1-inch to 2-inch discs is satisfactory. Reliability and repeatability as well as correlation with individual expert evaluation can be achieved by proper selection of aperture to mounting disc ratio. Another variable is the size and shape of the flexible sample. Tests indicate that a 10-inch diameter circular sample used in combination with a 2-inch aperture with a small clearance between the periphery of the aperture and the sides of the mounting discs produces satisfactory results. The shape of the aperture and corresponding mount need not be circular to achieve useful results. It has been found, however, that a circular configuration allows a flexible sample to fall freely and gently in uniform posture. Such uniformity encourages similar folds about the periphery of the mount and thereby encourages uniformity of test results.

In a typical test, the sample 5 would be clamped in place by means of the discs. Then the specimen sample would be lowered to the platform where it would assume a flat posture. The horizontal head 9 would then be motivated upward, thereby carrying the rod 12 and the mounted sample 5 along with it. At some point, the moving sample rises free of the platform and then engages the periphery of the aperture 14; and the transducer responds to the resistance offered to movement of the rod by reason of the engagement of the sample with the sides of the aperture. If a continuous record is made of the instantaneous values of force needed to draw the flexible material through the aperture and a known time scale is used, the work can be determined by integration. It is readily seen that also recorded would be certain peaks and valleys as the resisting force changes.

Figure 4:
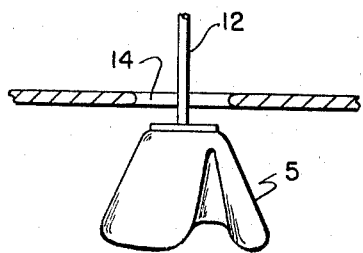
FIGURE 4 is a schematic sectional elevation showing a flexible sample mounted in accordance with the present invention and shows an aperture through which the sample is drawn.
Figure 5:
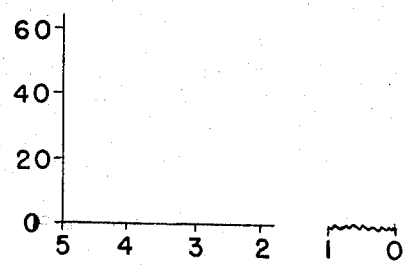
FIGURE 5 shows a typical recorder chart plot of force opposing movement of the mounted sample through the aperture corresponding to the condition of FIGURE 4.

FIGURES 4 through 9 show steps encountered in a typical test as outlined above. FIGURE 4 shows the start of a test with the flexible sample 5 elevated to a position above the platform so that it hangs freely from its support with no restraint occurring about its periphery. The material has not yet engaged the periphery of the aperture 14. FIGURE 5 shows a chart plot of the forces resisting passage of the material through the aperture 14. The chart position in this figure is zero corresponding to the position of the sample as indicated in FIGURE 4. The zero reading is obtained by compensating for the gravitational forces. As the rod 12 moves upward, the flexible sample 5 initially engages the aperture 14.

Figure 6:
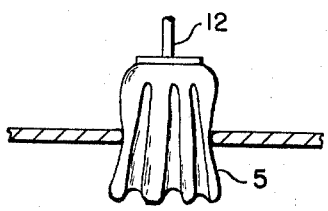
FIGURES 6 to 9 are similar views showing the successive steps involved in drawing the sample through the aperture and the corresponding forces produced at the various stages.
Figure 7:
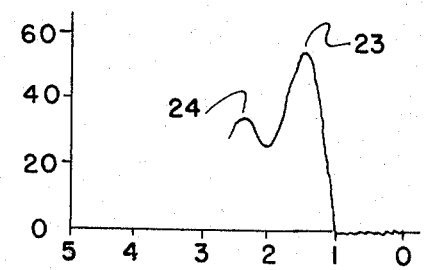

FIGURE 6 shows an early intermediate step in the process. The sample is partially through the aperture. Intermediate response of the force transducer is shown in FIGURE 7. From the point of initial engagement, the force exerted by the material engaging the aperture increases along a rather smooth curve to a first maximum 23 which is termed the break point. As a rule, tests show that this point is the highest reading and can be controlled by choice of mounting disc to aperture ratio. Following the break point, there usually appears a second maximum 24 in the curve occurring approximately one-half way through the drawing up of the sample through the aperture. This has been termed the draw point and can be controlled in magnitude by varying the mounting disc to aperture ratio.

Figure 8:
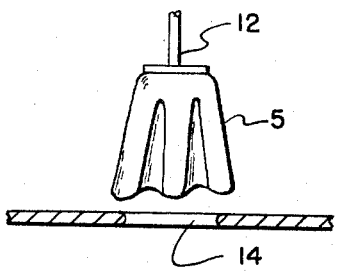

FIGURE 8 shows the mounted sample just after it disengages with the sides of the aperture.

Figure 9:
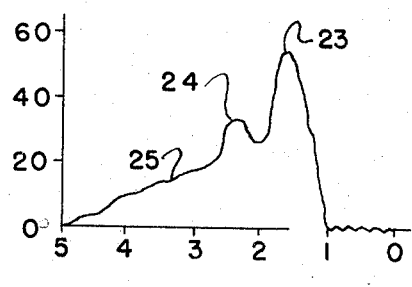

FIGURE 9 is the corresponding completed chart plot showing the break point and draw point. The draw point is the start of a progressive decrease of force until a leveling off 25 occurs. This leveling off is termed the skirt and is followed by a rather abrupt drop to zero as the material emerges from the aperture.

According to common practice empirical relationships were developed to predict the break point and the work in terms of thickness and density. Initial tests were centered on non-woven materials. It was found that a proportionality exists between the break reading and the integrated reading. This proportionality was different for each material studied. Further, a definite relationship was found to exist between the maximum reading and the density of the material for a given thickness.

In view of their initial studies, it is anticipated by the present inventors that the curves generated by the present invention should prove to be a method of correlating the drape with the physical make-up of a given material.

A typical classification of fabrics in terms of the kinesimeter reading is as follows:

| Item | Grams | Weight (oz./yd.$^2$) | Gage (10$^{-3}$ inches) |
|---|---|---|---|
| Acetate | 10 | 1.06 | 4.0 |
| Silk | 19 | 3.09 | 7.8 |
| Trump Broadcloth | 34 | 3.47 | 10.3 |
| Wash and Wear Broadcloth | 58 | 3.72 | 7.9 |
| Canvas, Green | 500 | 9.62 | 21.0 |

The second column is the break force in grams.

Figure 10:
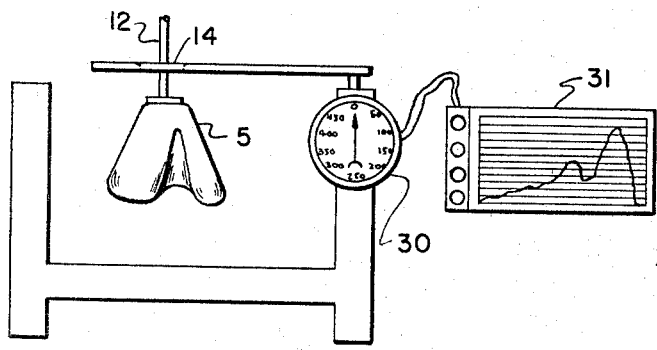
FIGURE 10 is a schematic partial elevation view of an alternate embodiment of the present invention.

FIGURE 10 indicates another embodiment of the present invention. Here the ring 13 is connected to a spring scale 30 or other simple force transducer. As an upward force is exerted on the ring, the transducer responds accordingly and measures the force. Such force would be exerted by engagement of the moving test sample 5 with the aperture 14. The transducer can be connected to a suitable continuous recording readout device 31.

In the foregoing detail description it is readily seen that the rod can be replaced with any suitable supporting means and its movement within the ring aperture can be effected by means of any suitable mechanical device. It can be seen also that the cross head can be replaced by a variety of means such as a movable arm without impairing proper ability of the apparatus. Many other such modifications are anticipated by the present inventors and become obvious after a reading of the foregoing detailed description.

It can be seen from the foregoing that the present inventors have described a new and improved apparatus which contributes to the art and constitutes significant advances therein. Therefore, the present inventors claim:

1. An apparatus for determining the drape of flexible materials, said apparatus having a means for moving a piece of material through an aperture of a size such as to allow, but offer resistance to, passage of the piece through the aperture, comprising in combination: a frame; a substantially horizontal ring attached to the frame, a support disposed within the aperture and vertically movable in relation to said aperture; a circular mount comprising a disk and connected to said support at one end thereof; said mount being adapted to support the piece without peripheral restraint and such that the material is allowed to drape freely and assume a natural shape about its periphery; said moving means including means operatively connected to the support for moving the support and thus urging the piece through the aperture; and further means operatively connected to the support for continuously measuring the forces opposing passage of the piece through the aperture.

2. The apparatus of claim 1 wherein the support is adapted to move at a constant rate of speed.

References Cited

UNITED STATES PATENTS

| 2,714,328 | 8/1955 | Hamburger et al. | 73—159 X |
| 2,833,146 | 5/1958 | Wharton | 73—159 |
| 2,930,229 | 3/1960 | Sobota | 73—159 |
| 3,005,340 | 10/1961 | Smith | 73—159 |
| 3,151,483 | 10/1964 | Plummer | 73—159 |

DAVID SCHONBERG, *Primary Examiner.*